United States Patent
McMillan

(10) Patent No.: US 7,922,456 B2
(45) Date of Patent: Apr. 12, 2011

(54) LIGHTWEIGHT COMPONENTS

(75) Inventor: Alison J. McMillan, Uttoxeter (GB)

(73) Assignee: Rolls-Royce, Plc, London (GB)

( * ) Notice: Subject to any disclaimer, the term of this patent is extended or adjusted under 35 U.S.C. 154(b) by 579 days.

(21) Appl. No.: 11/604,202

(22) Filed: Nov. 27, 2006

(65) Prior Publication Data
US 2007/0140862 A1 Jun. 21, 2007

(30) Foreign Application Priority Data

Dec. 20, 2005 (GB) .................................. 0525799.3

(51) Int. Cl.
*F01D 5/18* (2006.01)
(52) U.S. Cl. ...................................................... 416/232
(58) Field of Classification Search .................. 416/232
See application file for complete search history.

(56) References Cited

U.S. PATENT DOCUMENTS

| 2,648,520 | A | * | 8/1953 | Schmitt ..................... 416/229 A |
| 4,327,154 | A | * | 4/1982 | Rossmann ..................... 428/545 |
| 4,582,534 | A | * | 4/1986 | Torobin ......................... 428/570 |
| 4,925,740 | A | * | 5/1990 | Norris et al. .................... 428/570 |
| 5,024,289 | A | * | 6/1991 | Merry ............................ 181/231 |
| 5,073,459 | A | * | 12/1991 | Smarsly et al. ................ 428/550 |
| 5,230,850 | A | * | 7/1993 | Lewis ............................ 264/112 |
| 5,634,189 | A | * | 5/1997 | Rossmann et al. ............. 428/547 |
| 6,062,316 | A |   | 5/2000 | Alhamad |
| 6,641,907 | B1 | * | 11/2003 | Merrill et al. ............... 428/313.9 |

FOREIGN PATENT DOCUMENTS

| DE | 198 17 959 C1 | 7/1999 |
| GB | 1 138 792 | 1/1969 |
| GB | 2 284 825 A | 6/1995 |
| GB | 2 418 459 A | 3/2006 |
| JP | A 2000-168839 | 6/2000 |
| WO | WO 2005/084854 A1 | 9/2005 |

* cited by examiner

*Primary Examiner* — Richard Edgar
(74) *Attorney, Agent, or Firm* — Oliff & Berridge, PLC

(57) ABSTRACT

A lightweight component in the form of an outlet guide vane for a gas turbine engine and a method of manufacturing such lightweight components are provided. The vane is filled with hollow metal ellipsoid members in a solid metal outer member. The arrangement of hollow metal ellipsoid members allows directionally tailored stiffness or strength.

16 Claims, 5 Drawing Sheets

LIGHTWEIGHT COMPONENTS

The present invention relates to a component, especially a component for a gas turbine engine, and also to a method of manufacturing such components.

With many components, and especially those in gas turbine engines, there is a desire for reduced weight whilst maintaining the mechanical properties of the component as far as possible.

Conventionally the fan and compressor blades and the fan outlet or bypass guide vanes and compressor vanes for a gas turbine engine are solid metal.

It is known for the fan blades to be made from solid metal walls between which is provided a honeycomb structure to reduce the weight of the fan blades and the fan blade is produced by joining the peripheries of the solid metal walls together by brazing, bonding or welding. It is also known for the fan blades to be made from solid metal walls between which extends a solid metal warren girder structure to reduce the weight of the fan blades, and the fan blade is produced by diffusion bonding and superplastic forming of the solid metal pieces. It is also known for the fan blades to be made from composite material to reduce the weight of the fan blades. Fan outlet guide vanes can also be made in a similar manner to fan blades.

It is known to make components in which a solid metal wall, defining the component shape, is filled by hollow spheres (for example, in U.S. Pat. No. 4,925,740). Typically, the wall and spheres are bonded together to form a unitary construction.

If three mutually perpendicular axes are defined for a sphere, the lengths of all three axes are equal and the three mutually perpendicular cross-sections are circular. A spheroid is a three-dimensional shape in which exactly two axes are of equal length, and it has one circular and two elliptical cross-sections. The three axes of an ellipsoid are all of different lengths, and all three of its cross-sections are elliptical. The longest axis of a spheroid or ellipsoid is referred to as the major axis.

It is known that random packing of ellipsoids will provide a greater packing fraction than random packing of spheres (for example, in U.S. Pat. No. 6,062,316).

According to the present invention there is provided a component and a method for manufacturing a component as claimed in the independent claims.

Embodiments of the present invention will now be described by way of example only and with reference to the accompanying drawings, in which.

Figure 6A:
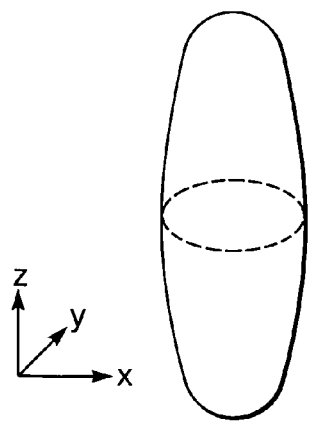
Figure 7:
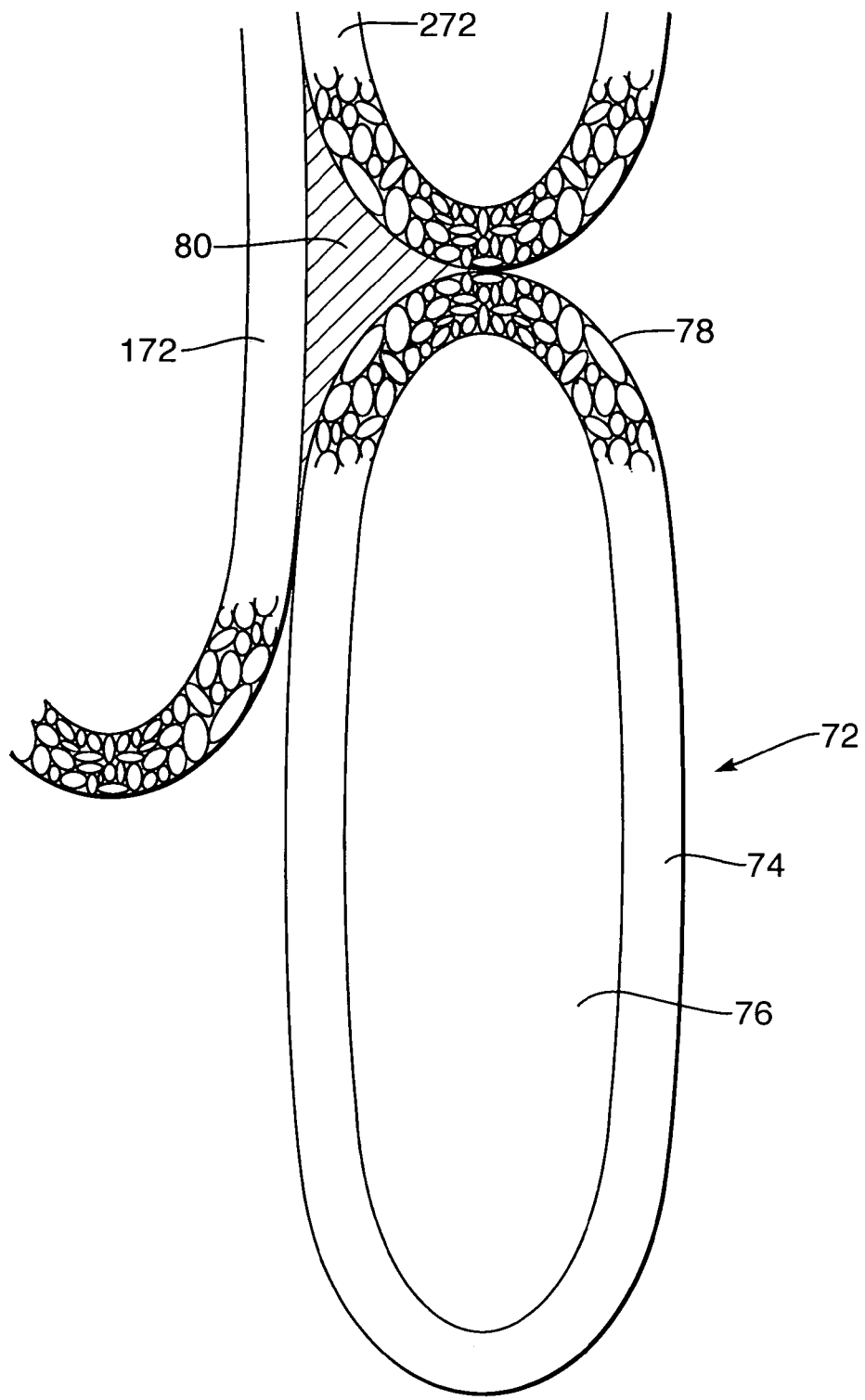

FIGS. 6(a), (b), (c) and (d) are schematic illustrations of a perfect ellipsoid and three possible distortions thereof; and FIG. 7 is a schematic sectional view through a part of a lightweight component in accordance with the invention, in which the hollow bodies are themselves formed of a foamed material.

Figure 1:
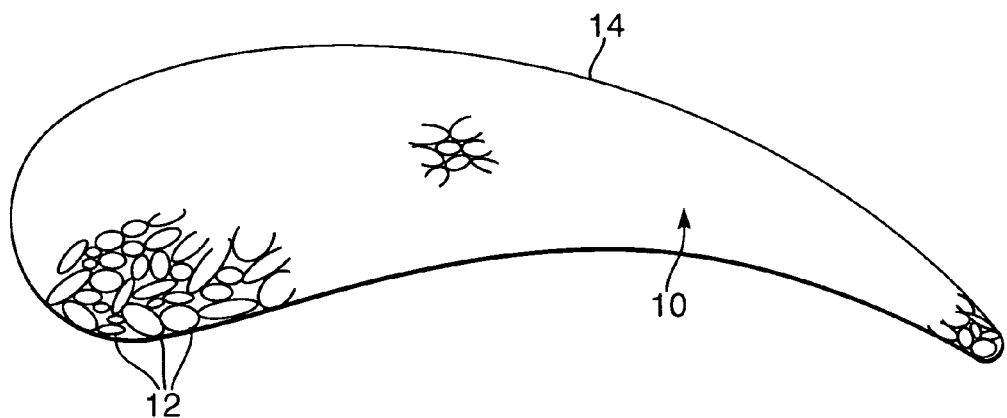
FIG. 1 is a diagrammatic sectional view through a first aerofoil according to the invention.

FIG. 1 shows an outlet guide vane 10. The vane 10 is formed by filling an appropriate shaped mould with hollow metal ellipsoid members 12, only some of which have been shown in FIG. 1 for clarity. The members 12 may for example comprise a titanium alloy such as Ti64, which consists of 6 wt % of aluminium, 4 wt % of vanadium, with the remainder titanium, minor additions and incidental impurities. This is located in the mould and compacted under pressure and using vibration. It has been found that the ellipsoids pack very well and provide a very dense random packing. The hollow metal ellipsoids are sintered at a temperature of between 770° C. and 1310° C. The sintered body thus formed can be located within a hollow outer member 14 to form the vane 10.

As an alternative to locating the sintered body within a hollow outer member 14 to form the vane 10, a matrix material may be introduced around the hollow metal ellipsoids while they are in the mould, and this matrix material will define the outer surface of the component. Typically, the matrix material will be poured into the mould. Any suitable matrix material may be used, but molten metal and resin are regarded as particularly suitable materials.

The lengths of the major axes of the ellipsoid members 12 range between 10 and 10,000 µm, and are preferably between 30 and 2000 µm. The sintered body thus formed is found to be very light, and has a density of less than 3 g/cm$^3$ and preferably of less than 1 g/cm$^3$. The aerofoil thus formed has improved fatigue behaviour and impact capability due to the structure created by the sintered hollow members.

Figure 2:
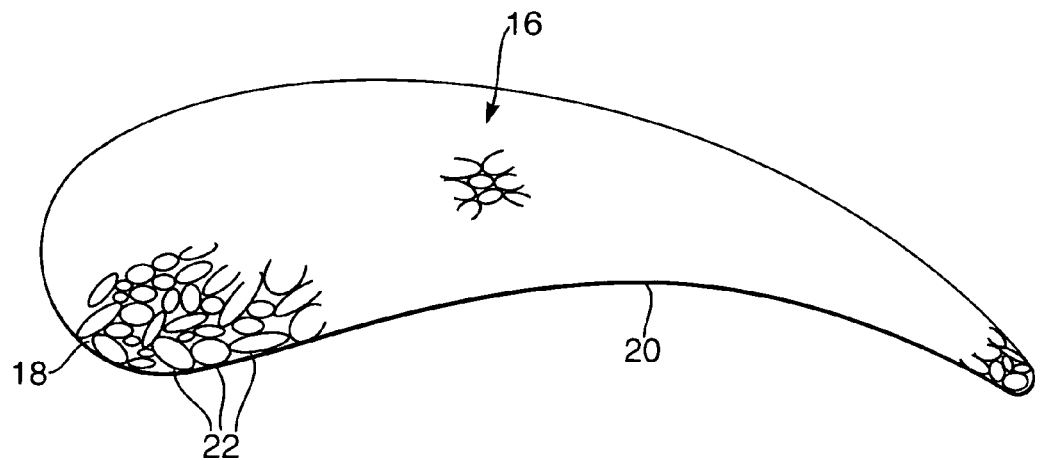
FIG. 2 is a similar view of a second aerofoil according to the invention.

FIG. 2 shows a fan blade 16 made up of a metal foam 18, only part of which is shown for clarity, and a solid metal outer 20. The foam 18 may be made by one of two methods. The foam 18 may be provided by filling the outer 20 with a molten metal syntactic mix, including spheroid hollow metal members 22. Alternatively, hollow metal spheroid members 22 may be supplied into the outer 20 with a space holder. The metal members 22 are sintered together and bonded to the outer 20. Before sintering, the metal members 22 will be packed down and optionally vibrated within the outer 20. Again it is found that the spheroid members 22 provide for a very good random packing within the outer.

Figure 3:
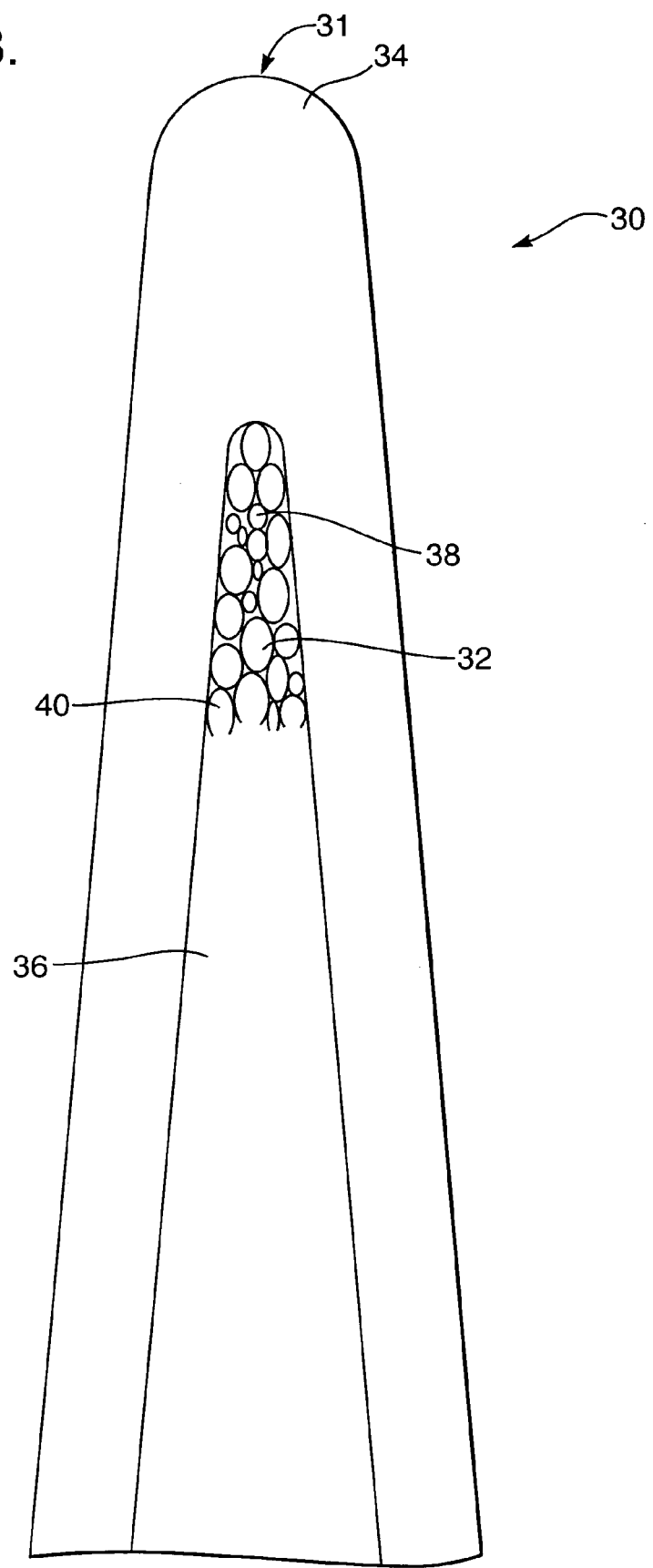
FIG. 3 is a diagrammatic sectional view through part of an aerofoil according to the invention.

FIG. 3 is a sectional view of part of a fan blade 30, near to a tip 31 of the fan blade 30. The blade 30 is formed by filling an appropriate shaped mould with hollow metal ellipsoid members 32, only some of which have been shown for clarity. The composition of the members 32 is the same as for the members 12 in FIG. 1. The members 32 are located in the mould and compacted under pressure and using vibration, and subsequently sintered, as described with respect to FIG. 1 above. The sintered body thus formed can be located within a hollow outer 34 to form the vane 30.

It will be seen that the space 36, which is filled with the ellipsoid members 32, necessarily becomes very narrow at its end, because the outer 34 is also narrowing towards the tip 31. The ellipsoid members 32, unlike the spheres used in known arrangements, have a narrower cross-section in some directions than others and can therefore turn in ways that spheres cannot, so as to pack more effectively into the narrow space at the tip of the space 36. Some ellipsoids 38 have turned "end-on" (with their longest axis perpendicular to the plane of the paper) and this further improves the packing efficiency.

It will also be seen that the majority of the ellipsoid members 32 are aligned with their longest axis from top to bottom in the plane of the paper, as exemplified by the member 40. Because the ellipsoid members 32 have different dimensions along their three axes, and will therefore have different mechanical properties in those three directions, this property can be exploited to provide directionally tailored stiffness or strength in the fan blade.

A further advantage of this arrangement of ellipsoid members 32 is that the members 32 will more readily fill narrow spaces than would spheres of equivalent volume, for the reasons set out above, and therefore the filling of the space 36 can be accomplished with less pressure from the delivery means. This reduces the likelihood of damaging the ellipsoid members or any other part of the assembly.

Figure 4:
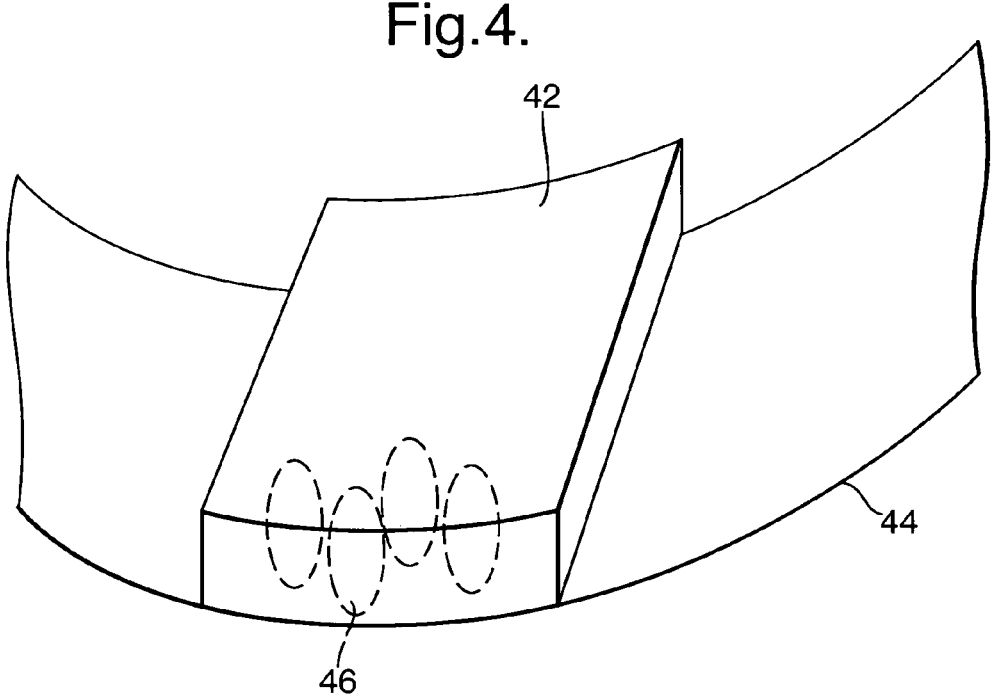
FIG. 4 is a schematic perspective view of a sector panel in accordance with the invention.

FIG. 4 shows a further embodiment of the invention, a sector panel for a gas turbine engine. Sector panels form part of the containment system of a gas turbine engine. In use, a plurality of sector panels 42 would be arranged circumferentially around the annular containment casing 44, but for clarity only one panel 42 is shown.

The sector panel 42 is completely filled with hollow ellipsoids 46, though for clarity only a few are shown. Most, if not all, of the ellipsoids are arranged so that their major axes lie in a radial direction, relative to the containment casing 44.

Figure 5:
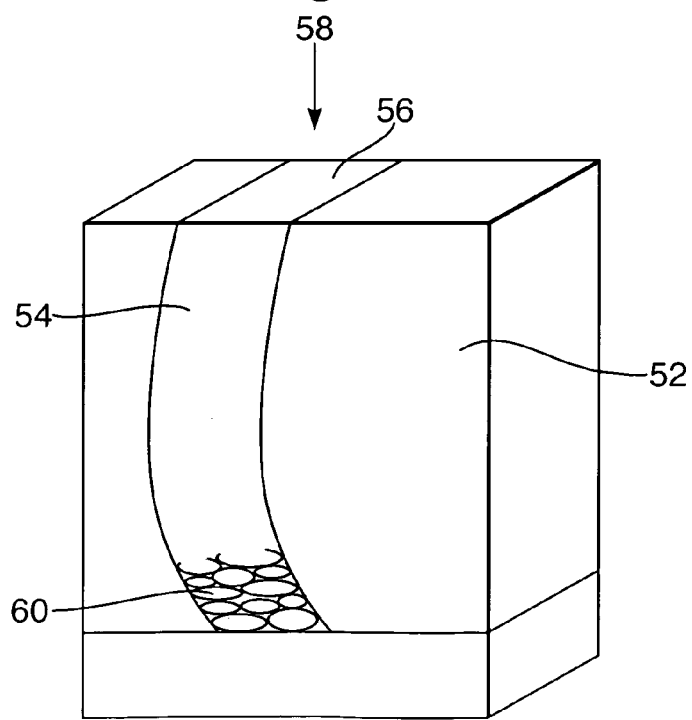
FIG. 5 is a schematic perspective view of one stage in the manufacture of the sector panel of FIG. 4.

FIG. 5 illustrates one stage in the manufacture of a sector panel as shown in FIG. 4. Tooling 52 defines a space 54 of the correct shape for the sector panel. Ellipsoids are allowed to fall by gravity into the opening 56 at the top of the space 54, as shown by the arrow 58. As the ellipsoids fall to the bottom 60 of the space 54, they will tend to roll under gravity to bring their centres of mass to the lowest position possible. Consequently, they will tend to arrange themselves with their major axes horizontal, as shown.

The ellipsoids are then compacted and sintered as for the embodiment of FIG. 1, and located within a hollow outer to form the sector panel 42.

Comparing FIG. 5 with FIG. 4, it will be clear that this method of manufacturing achieves the desirable result of having the ellipsoids 46 arranged with their major axes in a radial direction, when the sector panel 42 is located in the containment casing 44. The ellipsoids have greatest crushing strength in the direction of their major axes, and so the direction of the greatest crushing strength of the sector panel 42 will be in the radial direction. This alignment of the ellipsoids also maximises the distance over which they can be crushed, and therefore over which energy can be absorbed. In a blade-off event, it is desirable for the containment system to absorb as much energy as possible from the released blade, and by using this method of construction this property of the sector panel can be optimised while still taking advantage of the light weight afforded by the hollow construction.

Such a structure may also be useful in other applications where crushing strength is important; for example, in crushing zones in cars, trains or other vehicles.

It is appropriate, at this point, to distinguish between a "perfect" ellipsoid and other ("distorted") ellipsoid shapes, which nevertheless will deliver the benefits of the invention as described.

FIG. 6(a) shows a perfect ellipsoid. Such an ellipsoid may be completely described by the equation $Ax^2+By^2+Cz^2=1$, where A, B and C are constants.

Figure 6B:
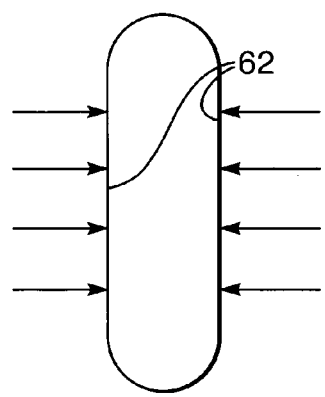

During the packing or compacting phases of the manufacture of a component according to the invention (for example, as described with reference to any of FIGS. 1-5) such perfect ellipsoids may be subjected to pressure, which may distort the ellipsoid as shown in FIG. 6(b). It will be observed that the sides 62 of the ellipsoid become flattened.

Figure 6C:
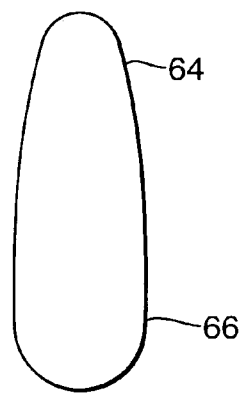

There may exist variability in the manufacturing process that produces the ellipsoids, so that the original ellipsoid is not perfect. FIG. 6(c) illustrates one possible imperfection, in which the upper part 64 of the ellipsoid is narrower than the lower part 66.

Figure 6D:
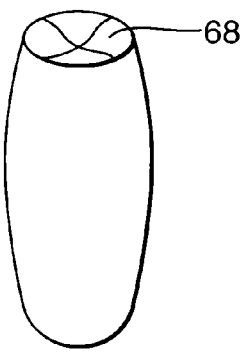

FIG. 6(d) illustrates an ellipsoid in which one end has been pushed inwards, forming a hollow 68. This may arise as a result of pre-working, before the ellipsoids are packed into the tooling, or may result from a treatment after filling to optimise the fit of the ellipsoids within the available space.

Ellipsoids having any of the distortions shown in FIGS. 6(b), (c) and (d)—individually or in combination—will nevertheless deliver the benefits of the invention as described. Furthermore, it will be apparent to a skilled person that other similar distortions, not specifically described here, will likewise not affect the working of the claimed invention.

It will be understood that where the term "ellipsoid" has been used, it is to be taken also to encompass the term "spheroid", and that spheroidal hollow elements may be distorted in the same ways described above in relation to ellipsoids. References in this specification to ellipsoids or to spheroids are to be taken to encompass the distorted forms as well as the perfect forms of these shapes.

There are thus described components, and also methods of making components, where the provision of spheroids or ellipsoids provides for significant advantages in random packing and in directional tailoring of the component's mechanical properties. Close form packing may be limited relative to the space which such members fill, and especially where this space is relatively small compared to the size of the hollow members. Where a matrix is provided around the hollow members, the matrix would take up less volume than would be the case with spherical hollow members. This reduces the weight and cost of the matrix.

Also, ellipsoids have a larger surface area than spheres of equivalent volume so the bond between the ellipsoids and the matrix should be better.

The invention is applicable not only to those components particularly described, but to any other component, particularly to other gas turbine aerofoils whether rotating blades or stators, and to other casing panels whether in a containment system or elsewhere in the engine. It is also applicable to other components in the field of gas turbine engines or in any other field, and especially in any component where there are features of narrow confined spaces coupled with a need for light weight and directionally tailored mechanical properties.

Of course, such narrow confined spaces are not only found in gas turbine engine components. They may also be found in such components as beams and trusses, for example in cranes, and in stiffeners or ribs in other components such as wing spars or car roof panels.

It is to be realised that a wide range of other modifications may be made without departing from the scope of the invention. For instance any suitable material, metal or non-metal, may be used for the hollow members, and this material may be in the form of a foam, so creating a foam within a foam. This type of construction is illustrated in FIG. 7. A hollow ellipsoid 72 comprises a skin 74 surrounding a major void 76. The skin 74 is composed of a plurality of hollow members 78, which together form a foam. Each hollow member 78 itself comprises a skin surrounding a minor void. These minor voids may themselves be ellipsoidal, spheroidal or spherical. To form a component, a plurality of hollow ellipsoids 72 are bound together using a matrix material 80. Parts of two further such ellipsoids 172 and 272 are visible.

If metal is used, it may be a different titanium alloy or may be aluminium, nickel, aluminium alloy, magnesium alloy, nickel alloy, steel etc. Appropriate sizes and configurations of ellipsoids and/or spheroids can be chosen for particular applications. A matrix material such as molten metal, resin or other filler material may be provided around the hollow members.

The hollow metal members may not be physically joined together, and could simply be contained within a hollow interior, such that the metal members can move to a certain degree relative to each other. With such movement, kinetic energy is lost by frictional contact between the members. This can provide damping, which can be of particular relevance for instance in gas turbine engines in aeroplanes especially in the event of a bird strike or flutter.

I claim:

1. A fan blade aerofoil for a gas turbine engine, comprising:
    a hollow outer portion defining a space;
    a plurality of hollow members filling the space, the plurality of hollow members being spheroids or ellipsoids and each having a major axis being a longest axis of the hollow member,
    wherein the space narrows at least one of an end and a tip of the space; and
    the major axes of more than half of the hollow members are turned to pack more efficiently into the at least one of the end and the tip of the space than spheres of equivalent volume.

2. The fan blade aerofoil for a gas turbine engine according to claim 1, further comprising an outer surface member defining a shape of the fan blade aerofoil.

3. The fan blade aerofoil for a gas turbine engine according to claim 2, the outer surface member including a wall or a shell.

4. The fan blade aerofoil for a gas turbine engine according to claim 2, wherein the outer surface member is formed from a matrix material molded around the plurality of hollow members.

5. The fan blade aerofoil for a gas turbine engine according to claim 2, wherein the plurality of hollow members are contained within the outer surface member and the plurality of hollow members are not joined to one another.

6. The fan blade aerofoil for a gas turbine engine according to claim 1, wherein the plurality of hollow members are joined to one another.

7. The fan blade aerofoil for a gas turbine engine according to claim 6, wherein the plurality of hollow members are joined to one another by a matrix material.

8. The fan blade aerofoil for a gas turbine engine according to claim 6, wherein the plurality of hollow members are sintered together.

9. The fan blade aerofoil for a gas turbine engine according to claim 1, wherein a length of the major axes of the plurality of hollow members is between 10 μm and 10000 μm.

10. The fan blade aerofoil for a gas turbine engine according to claim 1, wherein a length of the major axes of the plurality of hollow members is between 30 μm and 2000 μm.

11. The fan blade aerofoil for a gas turbine engine according to claim 1, wherein a portion of the fan blade aerofoil that comprises the plurality of hollow members has a density of less than 3 g/cm$^3$.

12. The fan blade aerofoil for a gas turbine engine according to claim 1, wherein a portion of the fan blade aerofoil that comprises the plurality of hollow members has a density of less than 1 g/cm$^3$.

13. A method of manufacturing a fan blade aerofoil for a gas turbine engine, comprising:
    forming a hollow outer portion having a space that narrows at least one of an end and a tip of the space;
    placing a plurality of hollow members in the hollow outer portion, the plurality of hollow members being spheroids or ellipsoids and each having a major axis being a longest axis of the hollow member; and
    sintering the plurality members in the hollow outer portion to form the aerofoil; and
    the major axes of more than one half of the hollow members are turned to pack more efficiently into the at least one of the end and the tip of the space than spheres of equivalent volume.

14. The method according to claim 13, wherein a matrix material is poured into the space around the plurality of hollow members.

15. A method of manufacturing a sector panel component for a gas turbine engine, comprising:
    providing a sector panel-shaped mould having an opening;
    orienting the mould such that the opening faces up;
    allowing a plurality of hollow members to fall by gravity into the sector panel-shaped mould opening, the hollow members being spheroids or ellipsoids and each having a major axis being a longest axis of the hollow member, the plurality of hollow members tending to roll under gravity to bring centres of mass of the plurality of hollow members to a lowest possible position, and
    sintering the hollow members in the mould to form the component,
    wherein the major axes of more than one half of the hollow members are aligned with and substantially parallel to the radial direction of a containment casing around which the sector panel component is arranged.

16. The method of manufacturing a sector panel component for a gas turbine engine according to claim 15, further comprising:
    locating the sector panel component within a hollow outer portion to form a sector panel.

* * * * *